Dec. 6, 1960 A. BANNER 2,963,134
FLUID OPERATED RELEASABLE TORQUE TRANSMITTING APPARATUS
Filed March 15, 1956 3 Sheets-Sheet 1
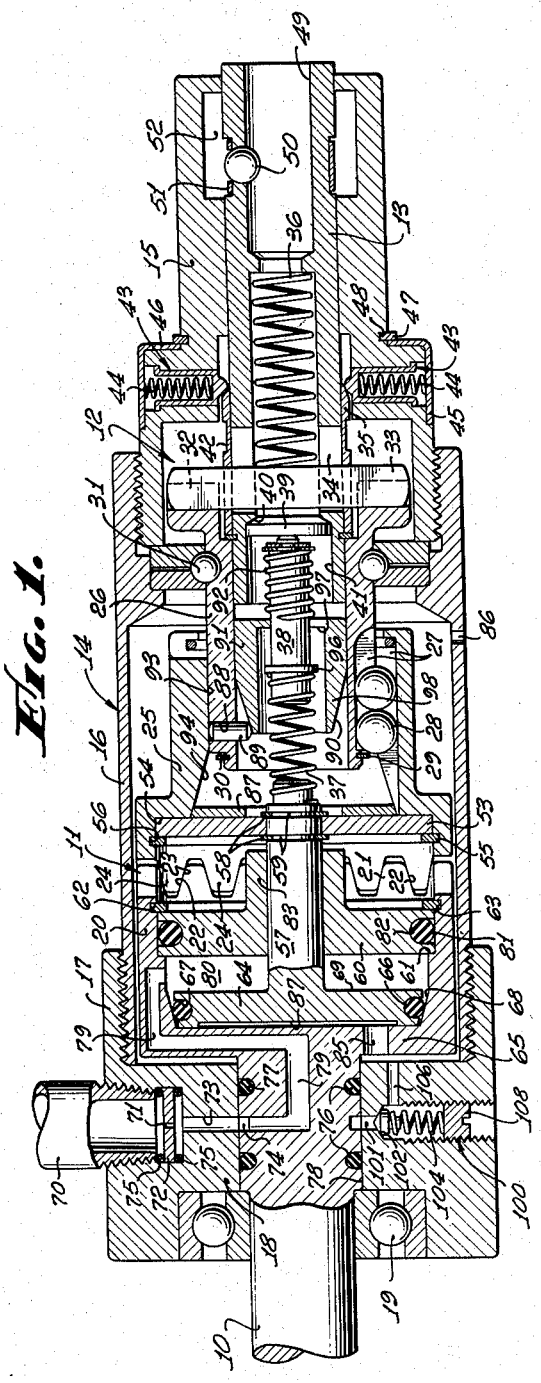
INVENTOR.
ARTHUR BANNER
BY
Bernard Kriegel
ATTORNEY.

Dec. 6, 1960 A. BANNER 2,963,134
FLUID OPERATED RELEASABLE TORQUE TRANSMITTING APPARATUS
Filed March 15, 1956 3 Sheets-Sheet 2
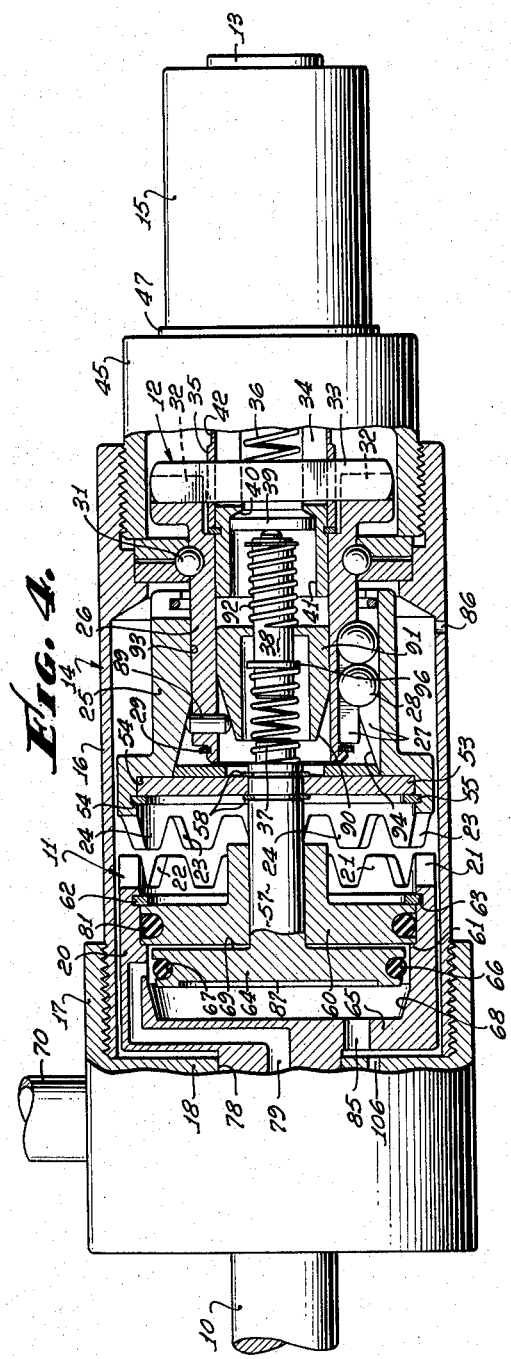
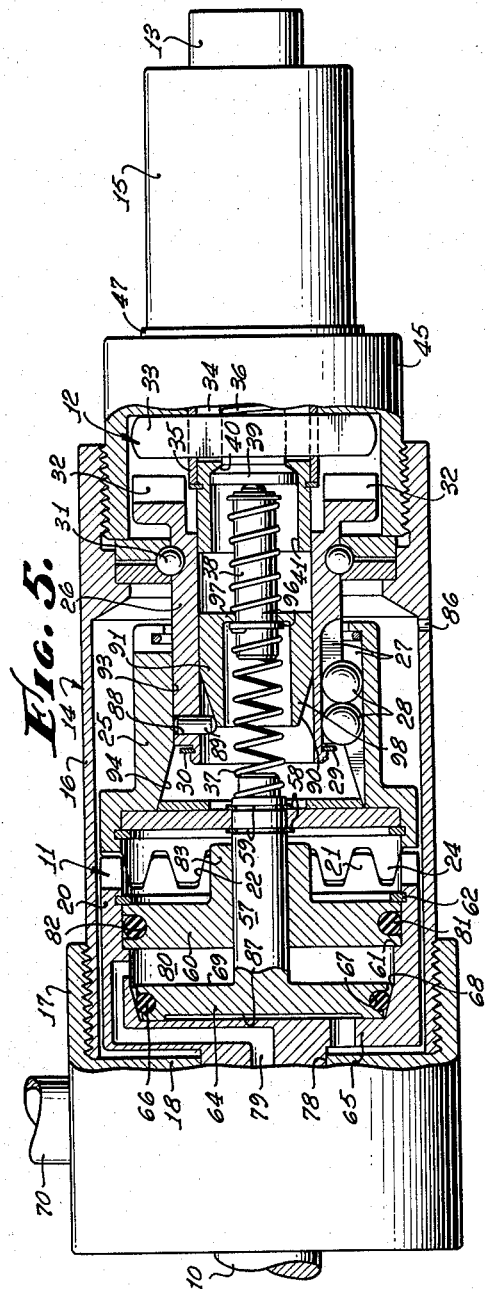
INVENTOR.
ARTHUR BANNER
BY
Bernard Kriegel
ATTORNEY.

Dec. 6, 1960  A. BANNER  2,963,134
FLUID OPERATED RELEASABLE TORQUE TRANSMITTING APPARATUS
Filed March 15, 1956  3 Sheets-Sheet 3
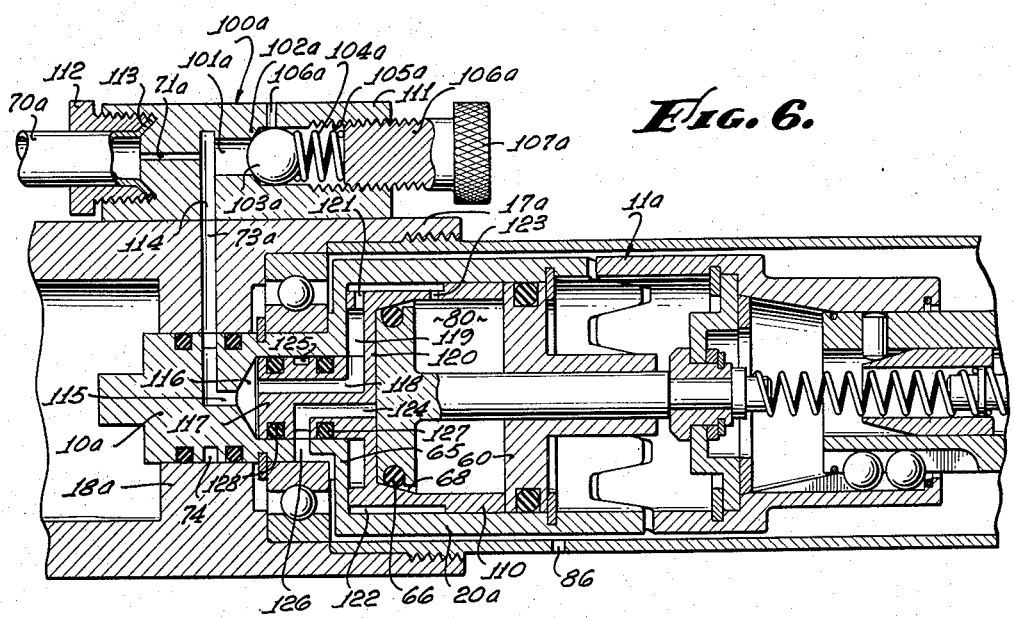
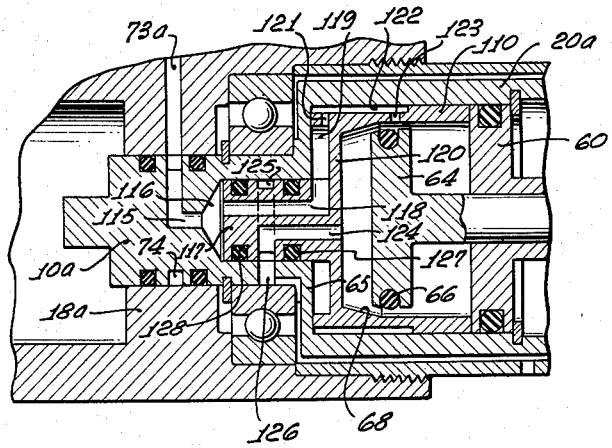
INVENTOR.
ARTHUR BANNER
BY
Bernard Kriegel
ATTORNEY.

2,963,134
Patented Dec. 6, 1960

United States Patent Office

2,963,134
FLUID OPERATED RELEASABLE TORQUE TRANSMITTING APPARATUS

Arthur Banner, Rivera, Calif., assignor, by mesne assignments, of one-half to Henry T. M. Rice, San Gabriel, and one-half to Bernard Kriegel, Los Angeles, Calif.

Filed Mar. 15, 1956, Ser. No. 571,650

14 Claims. (Cl. 192—56)

The present invention relates to torque transmitting apparatus, and more particularly to apparatus which becomes disconnected automatically when subjected to a predetermined torque.

Certain types of automatically releasable torque transmitting apparatus embody clutches, and the like, which are held engaged by fluid under pressure, such as compressed air. The torque at which a particular clutch will release is dependent upon the pressure of fluid tending to hold the clutch engaged. However, the pressure of the air, or other fluid, in the line leading to the apparatus tends to vary from a desired value, causing undesired corresponding variations in the torque at which the clutch will release.

Accordingly, it is an object of the present invention to provide a releasable torque transmitting apparatus in which the fluid pressure tending to hold the apparatus engaged in torque transmitting condition remains constant despite variations in the fluid pressure in the line leading to the apparatus, thereby insuring release of the apparatus when subjected to the predetermined torque.

Another object of the invention is to provide fluid operated releasable torque transmitting apparatus of the type indicated above, in which the fluid pressure acting on the apparatus can be readily varied, to correspondingly change the torque at which release or disconnection of the apparatus will occur.

An additional object of the invention is to provide fluid operated releasable torque transmitting apparatus of the type indicated above, in which the fluid pressure acting on the apparatus can be readily varied, without requiring a change in the fluid pressure in the line leading to the apparatus.

A further object of the invention is to provide fluid operated releasable torque transmitting apparatus in which the fluid pressure remains constant despite variations in the line pressure, and in which a comparatively small quantity of fluid, such as compressed air, is required for the proper operation of the apparatus.

This invention possesses many other advantages, and has other objects which may be made more clearly apparent from a consideration of several forms in which it may be embodied. Such forms are shown in the drawings accompanying and forming part of the present specification. These forms will now be described in detail, for the purpose of illustrating the general principles of the invention; but it is to be understood that such detailed description is not to be taken in a limiting sense, since the scope of the invention is best defined by the appended claims.

Referring to the drawings:

Figure 1 is a longitudinal section through one form of apparatus, with its primary and secondary clutches both engaged;

Fig. 2 is a longitudinal section through a portion of the fluid pressure holding device embodied in the apparatus;

Fig. 3 is an enlarged longitudinal section of the pressure relief portion of the apparatus;

Fig. 4 is a longitudinal section, shown partly in elevation, similar to the view illustrated in Fig. 1, with the primary clutch disengaged and the secondary clutch engaged;

Fig. 5 is a view similar to Fig. 4, with the primary clutch reengaged and the secondary clutch disengaged;

Fig. 6 is a fragmentary longitudinal section through another embodiment of the invention, with the parts in one relative position;

Fig. 7 is a fragmentary section of a portion of the device shown in Fig. 6, with certain of the parts in another relative position.

The apparatus illustrated in the drawings has been designed primarily for rotating and tightening a threaded fastening element (not shown), such as a nut or screw. Only the torque releasable portion of the apparatus is illustrated for purposes of simplicity, although the apparatus will normally be associated with a suitable prime mover (not shown) for effecting its rotation. The prime mover rotates a drive shaft 10, either directly or indirectly (as through reduction gearing), which transmits its motion through a torque releasable primary clutch 11, from where the rotary motion is transmitted through a secondary clutch 12 to a spindle 13 to which a suitable tool (not shown), such as a socket wrench or screw driver, is secured, the latter being applicable to the threaded fastening element.

The apparatus is contained within a suitable housing or casing 14, which includes a forward portion or section 15 in which the spindle 13 is rotatably mounted, that is threadedly secured within the forward end of an intermediate housing section 16, which is, in turn, threadedly secured within a rearward housing section 17 having a transverse wall 18 in which the drive shaft 10 is rotatably mounted, this drive shaft being carried by the housing section through a suitable ball or other anti-friction bearing 19.

The drive shaft 10 is integral with, or otherwise suitably secured to, the driving member 20 of the primary clutch 11, which has axially extending clutch teeth 21 provided with inclined or cam type of driving faces 22 engaging companion inclined faces 23 on driven clutch teeth 24 on the driven member 25 of the primary clutch. The rotation of the driven member 25 is imparted to the driving member 26 of the secondary clutch 12 through a slidable spline connection. As shown, this spline connection includes opposed longitudinal grooves 27 provided within the driven member 25 and the driving member 26 of the secondary clutch, which receives one or a plurality of ball elements 28 therewithin that, in effect, function as rollable keys serving to transmit the rotation of the driven member to the secondary driving member, while allowing the driven member 25 to shift axially along the driving member 26. The balls 28 are prevented from dropping out of the longitudinal grooves 27 by split snap rings 29 located within grooves 30 at the rear end portion of the secondary clutch driving member and also in the forward portion of the primary clutch driven member 25.

The secondary clutch driving member 26 is rotatably mounted within the forward portion of the intermediate housing section 16 through the agency of a ball bearing 31, which serves to transmit radial loads between the secondary driving member and the housing member, as well as to resist axial displacement of the secondary driving member. This driving member 26 of the secondary clutch has a plurality, such as a pair, of diametrically opposed clutch teeth or lugs 32 engageable with a transverse pin 33 extending through a transverse and elongate slot 34 formed through the rearward portion of the spindle or driven member 13 of the secondary clutch, which is both rotatably mounted and axially movable within the forward housing section 15. This pin 33 may be of square or rectangular cross-section, and will transmit the rotation of the driving member 26 of the secondary clutch to the spindle 13. The transverse pin or clutch element 33 projects in opposite directions through a guide and latch sleeve 35 slidable on the spindle 13, this guide and latch sleeve preventing tilting or rocking of the transverse pin in the spindle.

The guide and latch sleeve 35 and the driven clutch pin 33 are normally urged in a rearward direction, to tend to hold the pin in engagement with the secondary clutch driving teeth 32, by a helical spring 36 disposed in the spindle and bearing upon the pin. When the spindle 13 is urged rearwardly in the housing 14, the rearward force is transmitted through the spring 36 to the pin 33, urging the latter toward engagement with the primary clutch teeth 32 and tending to maintain such engagement. When the pin 33 is fully engaged with the clutch teeth, the rearward end of the spindle slot 34 may be spaced away from the pin, to prevent the spindle from interfering with full engagement of the pin with the teeth 32 under the influence of the spring 36.

The spindle 13 is urged in the opposite direction to disconnect the pin 33 from the secondary clutch teeth 32 by a disengaging spring 37. The helical disengaging spring bears against an inner spindle member 38 to urge the latter in a forward direction and cause its end to engage a transverse disc 39 which, in turn, engages a shoulder or base portion 40 of an enlarged bore 41 formed in the spindle itself. The helical spring 37 acts through the spindle member 38 and the disc 39 to urge the secondary clutch driven member or spindle 13 in an outward or forward direction.

The forward movement of the spindle 13 will cause the rear end of the spindle slot 34 to engage the clutch pin 33 and carry it, together with the guide sleeve 35, in a forward direction, until the pin is completely out of engagement with the secondary clutch driving teeth 32. When this occurs, a peripheral groove 42 in the guide sleeve is disposed opposite one or more detents 43 slidably mounted in the forward housing section 15, each detent device including a helical spring 44 disposed within the detent and urging it toward the groove 42, the outer portion of each spring engaging a retaining sleeve 45 disposed around the housing section 15 and having a flange 46 secured to the housing section by a contractible split snap ring 47 received within a peripheral groove 48 in the forward housing section. When the guide sleeve groove 42 is disposed opposite the detents 43, the springs 44 will force the latter partially into the groove 42 and hold the sleeve 35 and the clutch pin 33 in a clutch releasing or disconnected position.

The tool (not shown), such as the socket wrench or screw driver bit, is insertable within the forward spindle socket 49, being retained in appropriate position by a detent ball 50 in the spindle wall which is urged in an inward direction by a split band spring 51 encompassing the spindle. When the tool is inserted in the spindle socket 49, the ball 50 is urged in an outward direction within a housing extension recess 52, until a companion groove or recess in the tool (not shown) is opposite the detent ball 50, which then is forced by the spring 51 into such recess, to hold the tool in place.

The rotation of the driving member 20 of the primary clutch 11 is transmitted to the driven member 25 through the coengaging cam type of clutch teeth 21, 24. The torque being transmitted through these teeth tends to shift the driven member 25 axially out of engagement from the driving member 20, because of the slope of the teeth cam faces 22, 23. The driven clutch teeth are held in engagement with the driving teeth against the disengaging force associated with the transmitted torque by an air, or similar, fluid pressure differential device. Thus, a plate 53 is secured against axial movement with respect to the driven member of the primary clutch by bearing against a shoulder 54 on the driven member, being retained in this position by a suitable split snap ring 55 disposed in a groove 56 in the driven member 25.

A valve stem 57 is attached to this plate by split retaining rings 58 located on opposite sides of the plate and disposed in peripheral grooves 59 in the valve stem. The valve stem extends through a forward end closure member or plate 60, which forms part of the valve body portion of the driving member. The end closure is secured to the driving member 20 by engaging a shoulder 61 on the latter, being retained thereagainst by a split snap retaining ring 62 disposed in a groove 63 in the driving member. The rearward end of the stem 57 is secured to, or is integral with, a valve head 14 adapted to move in a forward direction into engagement with an end wall 65 of the driving member 20, to dispose a peripheral seal ring 66, carried in a peripheral groove 67 on the valve head, in engagement with a companion tapered seat 68 provided on the driving member valve body.

The holding force for maintaining the driven clutch teeth 24 in engagement with the driving clutch teeth 21 is provided by causing fluid under pressure, such as air, to act on the forward face 69 of the valve head 64, which urges it into engagement with the end wall 65 of the valve body, with its seal ring 66 in engagement with its companion seat 68. Air from a suitable source and under pressure flows through an inlet line 70 connected to the rearward housing section 17, this air passing through a choke orifice 71 provided in an orifice plate 72 clamped in the housing wall 18, and thence into a transverse passage 73 in the wall 18, which opens into a peripheral groove 74 on the drive shaft 10. Leakage of fluid along the orifice plate 72 is prevented by rubber or rubber-like gasket rings 75 on its opposite sides clamped thereagainst by the wall 18 and the inlet line 70. Opposed seal rings 76, such as rubber or rubber-like O-rings, are located in peripheral grooves 77 on the drive shaft 10 on opposite sides of the peripheral air inlet groove 74, which seal rings rotatably and sealingly engaging the wall of the bore 78 in the housing wall 18 through which the drive shaft extends to prevent compressed air leakage along the shaft.

From the peripheral groove 74 the air flows through a tortuous inlet passage 79 in the driving member 20 that opens into the chamber 80 of its valve body portion rearwardly of the valve body closure member 60. Leakage of fluid around the closure member 60 is prevented by a suitable seal ring 81, such as a rubber or rubber-like O-ring, disposed in a peripheral groove 82 in the closure member and engaging the inner wall of the driving clutch member 20. The valve stem or rod 57 makes a sufficient close fit with the hub 83 of the closure member as to preclude any substantial leakage therealong from the chamber 80.

Leakage of air in a rearward direction from the chamber 80 is prevented whenever the valve head 64 engages the end wall 65 of the driving member or valve body 20, with the seal ring 66 engaged with the seat 68. However, when the valve head is shifted in the forward direction to disengage the seal ring from the seat, air can then flow around the valve head 64 to its rear portion, passing out of the chamber through an outlet port 85 and into the interior of the housing 14, then flowing around the driving and driven clutch members 20, 25 and exhausting from the housing through a suitable outlet port or ports 86.

The extent of movement of the valve head 64 and its seal ring 66 with respect to the tapered seat 68, to secure disengagement of the seal ring from the seat, is preferably of comparatively small extent. As an example, it may be about $\frac{1}{16}$ of an inch. Accordingly, only a slight forward movement of the valve head 64 will disengage the seal ring from the seat, and then allow the air in the chamber 80 and acting on the forward face 69 of the head to pass around the head to its rearward face 87, thereby equalizing the pressure on both sides of the head and effectively nullifying the force of the air pressure tending to hold the valve head 64 with its seal ring 66 engaged with the seat 68, this force having also been exerted on the driven member 25 and tending to hold its teeth 24 engaged with the driving member clutch teeth 21.

As stated above, when the valve head 64 is shifted forwardly from its seat 68 by the driven member 25, the air pressure equalizes on both sides of the head, and it can also exhaust from the valve body through the outlet openings 85, 86. Although air can exhaust through the outlet openings or ports, very little air is lost from the chamber 80, despite its continuous supply through the inlet line 70, since the area of the orifice 71 is comparatively small, and will only allow air at a relatively low rate to pass into and through the various passages 73, 79 to the chamber 80.

When the primary clutch 11 is engaged, with the valve head 64 engaging the end wall 65 of the valve body, and its seal ring 66 in sealing engagement with its companion seat 68, air under pressure acts upon the forward face 69 of the valve head and tends to hold it engaged with its companion seat, also tending to hold the driven clutch teeth 24 in full meshing engagement with the driving clutch teeth 21. When the torque being transmitted is sufficient to overcome the holding force of the air under pressure within the valve body, the cam teeth shift the driven member 25 in a forward direction to disengage the valve head 64 from the seat 68, 65. Since it takes only a slight movement of the valve head to effectively remove substantially all of the holding force of the air pressure upon it, full disengagement between the teeth 21, 24 occurs under comparatively no-load conditions, the driven member 25 being shifted longitudinally along the driving member 26 of the secondary clutch, with very little load being imposed upon the clutch teeth as they disengage. The driven member 25 is moved forwardly, its forward motion being limited by a rubber or rubber-like bumper device 87 secured to the driven member plate 53 and adapted to engage the rear end of the driving member 26 of the secondary clutch.

The driven member 25 is retained in the above disengaged position by a latch arrangement. The driving member 26 of the secondary clutch has a plurality of radial holes 88 therein containing laterally slidable detent members or pins 89 that are engaged by a tapered rearward cam face 90 on a latch sleeve 91 slidable within the driven member 26 of the secondary clutch, and also along the inner spindle member 38. A spring 92 constantly urges the latch sleeve 91 in a rearward direction, causing its cam face 90 to tend to shift the latch members or pins 89 in a radial outward direction. However, such shifting cannot occur when the driven clutch member 25 is fully engaged with the driving clutch member 20, since the latch elements 89 then engage an inner cylindrical surface 93 of the driven member.

When the driven member 25 is shifted in a forward direction to clutch disengaging position, an enlarged frusto-conical bore 94 of the driven member is then placed opposite the latch elements 89, allowing the latter to be shifted radially outward by the tapered face 90 of the latch sleeve 91, the latch elements then being in engagement with the divergent surface 94 on the driven member 25, and also with the tapered surface 90 of the latch member 91. Any tendency for the driven member 25 to be reclutched to the driving member 20 under the influence of the clutch reengaging spring 90, which engages the inner spindle member 38 and also the forward end of the valve stem 57, is resisted by the fact that the detent elements 89 are engaging both of the tapered surfaces 94, 90 referred to, the angle of taper of such surfaces being such that the detent elements cannot force the latch sleeve 91 in a forward releasing direction against the force of the spring 92, which urges and holds the latch sleeve in a rearward or holding direction.

To release the latch elements 89, it is necessary to shift the secondary clutch pin 33 out of engagement with the driving lugs or teeth 32 of the secondary clutch 12. So long as the secondary clutch is engaged, the driven member 25 of the primary clutch is held in its released position. The secondary clutch is maintained in engagement so long as an endwise, inwardly directed force is being exerted on the spindle 13, as when it is applied against a threaded fastening element. When the endwise force on the spindle 13 is removed, the spring 37 acts through the inner spindle member 38 to shift the spindle 13 forwardly to a position in which the guide sleeve 35 and secondary clutch pin 33 are held in a forward position by the detents 43 entering the sleeve groove 42, which holds the clutch pin 33 out of engagement with the teeth 32 of the secondary clutch driving member. During such forward motion of the spindle 13 under the influence of the spring 37, a flange 96 on the inner spindle member 38 engages an inwardly directed shoulder 97 of the latch sleeve 91, carrying the latter in a forward direction to a position in which its smaller diameter end portion 98 is disposed opposite the latch elements 89, allowing the latter to move inwardly of the driving member 26 of the secondary clutch. When this can occur, the reengaging spring 37 acts through the plate 53 to shift the primary clutch driven member 25 in a rearward direction, as well as the valve stem 57 and valve head 64, reengaging the latter with the end wall 65 of the driving member 20, with the valve seal ring 66 engaging the valve seat 68 and reengaging the driven clutch teeth 24 with the driving clutch teeth 21. During rearward movement of the driven clutch member 25, its divergent surface 94 forces the latch elements 89 inwardly to their initial retracted position entirely within the confines of the periphery of the driving member 26 of the secondary clutch, allowing the inner cylindrical portion 93 of the primary driven clutch member 25 to slide over the latch or detent elements, as disclosed in Fig. 1.

In the operation of the apparatus so far described, its parts may be assumed initially to occupy the positions illustrated in Fig. 1, in which the primary and secondary clutches 11, 12 are both engaged. The valve head 64 engages the end wall 65 of the valve body with its seal ring 66 engaging the valve seat 68. Air under the desired pressure flows through the passages 70, 71, 74, 79 into the valve chamber 80, acting upon the forward face 69 of the valve head and tending to hold the latter and the driven member 25 in a rearward direction to secure the primary clutch 11 in torque transmitting condition. The tool secured to the spindle 13 may be applied to the threaded fastening element and the drive shaft 10 rotated, the rotation being transmitted through the primary clutch driving member 20 to the driven member 25, and from the driven member through the splines 27, 28 to the driving member 26 of the secondary clutch, from where it passes through the transverse pin 33 to the spindle 13. As the threaded fastening element (such as a nut or screw) is tightened, the torque transmitted increases, this torque acting through the inclined coengaging clutch teeth 21, 24 and tending to shift the driven clutch member 25 in a forward direction out of engagement from the driving clutch member 20. This action is resisted by the holding force of the air pressure upon the valve head 64. To some extent, this holding force is also being provided by the clutch reengaging spring 37, but this spring is preferably made comparatively light so that the force is of comparatively minor significance.

When the predetermined force or torque is transmitted, corresponding to the holding force of the air under pressure upon the valve head 64, the driven member 25 is shifted in a forward direction. The initial shifting movement carries the valve head 64 away from the end wall 65 of the valve body and also its seal ring 66 from engagement with its companion seat 68, allowing the air on the forward side of the head to pass around it to its rearward side, equalizing the pressure on the head and reducing the holding force due to the air pressure to substantially zero. Accordingly, the torque transmitted can fully shift the driven member 25 in a forward direction to fully disengaged position under substantially no-load conditions. Of course, the air in the chamber 80 can then exhaust therefrom through the outlet openings 85.

As soon as the divergent surface 94 of the driven member 25 comes opposite the latch elements 89, the spring 92 urges the latch sleeve 91 in a rearward direction, forcing the latch elements outwardly to hold the driven member 25 in disengaged position with respect to the driving member 20. Accordingly, the drive to the spindle 13 and the tool (not shown) secured therewithin is disrupted. The secondary clutch 12, however, remains in engagement (Fig. 4).

The primary clutch 11 may be reset or reengaged as a result of disengaging the secondary clutch 12. Such disengagement occurs by removing the apparatus from the work, which permits the spring 37 to shift the inner spindle member 38 and the spindle 13 forwardly to a position in which the guide sleeve 35 and secondary clutch pin 33 are held in the forward position by the detents 43 entering the sleeve groove 42, which releasably holds the pin 33 out of engagement from the teeth 32 of the secondary clutch driving member 26. During such forward motion of the spindle 13 under the influence of the spring 37, the spindle member flange 96 engages the latch sleeve 91 and carries it in a forward direction to a position permitting the reengaging spring 37 to shift the primary driven clutch 25 in a rearward direction, to reengage the clutch teeth 21, 24 and again place the valve head 64 in engagement with the end wall 65 of the valve body, and with its seal ring 66 engaging the cylindrical seat 68, which then closes the chamber 80 against the escape of compressed air through the outlet openings 85, 86 (Fig. 5).

Compressed air can continue to flow into the chamber 80 during the time that the valve head 64 is disengaged from its seat, but very little air will actually be lost from the apparatus, in view of the restriction to air flow imposed by the choke orifice 71 in the orifice plate 72.

Despite the reengagement of the primary clutch 11, no rotation is being imparted to the spindle 13 since the secondary clutch 12 is still disengaged. Upon the application of an endwise force in the rearward direction on the spindle 13, as when the tool connected thereto is applied to a threaded fastening element, its spring 36 will force the sleeve 35 from under the detents 43, then shifting the clutch pin 33 and sleeve 35 rearwardly to a position in which the pin is again engaged with the driving teeth 32 of the secondary clutch. The parts are again in the position disclosed in Fig. 1.

The torque at which the primary clutch 11 will release is dependent upon the air pressure within the chamber 80. Obviously, an increase in the air pressure will increase the force tending to hold the primary clutch engaged, whereas a decrease in this pressure will provide a lesser force holding the clutch teeth engaged, disengagement of the primary clutch occurring when a lesser torque is transmitted therethrough. In actual practice, the pressure in the inlet line 70 will vary, causing corresponding variations in the pressure in the chamber 80. Accordingly, the apparatus will effect a release of the primary clutch 11 at an improper torque value. By virtue of the present invention, fluctuations in the air pressure in the inlet line have no effect whatsoever on the pressure in the chamber 80 and acting on the valve head 64, tending to hold it in its rearward position in the chamber, with the seal ring 66 engaged with its companion seat 68.

The air pressure provided in the inlet line 70 is always greater than the air pressure required in the chamber 80. The excess air pressure is relieved from the apparatus by means of a pressure relief valve 100, which, in effect, bleeds the excess air from the apparatus. As disclosed most clearly in Figs. 1 and 3, the pressure relief valve includes an inlet port 101 communicating with the peripheral groove 74 in the drive shaft 10, which is surrounded by a valve seat 102 adapted to be engaged by a valve head 103, the head being urged toward its valve seat engaging position by a helical compression spring 104 disposed within a transverse bore 105 in the housing section 17, with the inner end of the spring engaging the valve head 103 and its outer end engaging an adjustable spring seat 108 which is threadedly disposed within the bore 105. It is evident that any pressure in the passages 73, 79 and the peripheral groove 74 will act on the valve head 103, tending to urge it in an outward direction away from its seat 102. When shifted from its seat, the air under pressure can then flow around the valve head 103 and exhaust from the pressure relief valve through an outlet passage 106 and into the housing 14 of the apparatus, from where the air can pass to the atmosphere through the outlet port 86.

The spring 104 exerts a certain force on the valve head 103 tending to hold it engaged with its seat 102. The spring seat 108 is appropriately adjusted in the threaded bore 105, so that the force exerted by the spring 104 on the valve head 103 corresponds to a certain desired pressure which is to be maintained within the pressure chamber 80 of the apparatus. When such pressure is exceeded, the pressure relief or bleeder valve 100 is opened, to allow the air to escape through the exhaust or outlet ports 106, 86 to the atmosphere, thereby maintaining the required pressure in the passages 73, 74, 79 and in the chamber 80. As an example, assume the air pressure in the inlet line 70 to be 100 p.s.i., and a desirability to have an air pressure of only 50 p.s.i. in the chamber 80, tending to hold the valve head 64 in its rearward position, with its seal ring 66 in contact with its companion seat 68. The force of the spring 104 will be adjusted so that the relief valve will open when a unit pressure of 50 p.s.i. is exceeded. Inasmuch as the orifice 71 will only allow air under pressure to flow at a rather small rate into the passages 73, 74, 79 of the apparatus, any excess pressure in such passages above 50 p.s.i. will open the bleeder valve 100 and will be reduced. As an example, if the pressure were to tend to become 51 p.s.i. in the passages, the bleeder valve will open and air will be allowed to escape through the pressure relief valve at a sufficient rate as to maintain the pressure in the passages and in the chamber 80 at 50 p.s.i. If the pressure in the passages were to increase further to 60 p.s.i., for example, then the pressure relief valve would open to a much greater extent to allow a greater amount of air to escape through the exhaust ports 106, 86, in order to maintain the pressure in the passages and in the chamber at the desired value, which has been taken by way of example to be 50 p.s.i. The pressure in the passages 73, 74, 79, which are on the outlet side of the orifice 71, will always be less than the pressure in the inlet line 70 on the inlet side of the orifice, the orifice functioning as a throttle to reduce the pressure in the passages.

Accordingly, it is evident that should the air pressure in the inlet line 70 vary, the amount of air allowed to escape by the pressure relief valve 100 will correspondingly vary, maintaining the air pressure in the passages 73, 74, 79 and in the chamber 80 at the desired constant value.

Inasmuch as the pressure in the inlet line 70 is always substantially greater than the pressure in the chamber 80, air will constantly escape through the pressure relief valve 100. However, the loss of air will be very small, in view of the small area through the choke orifice 71. Similarly, as noted above, even when the primary clutch 11 has been released, the air escaping from the chamber 80 through the outlet ports 85, 86 will also be very small in quantity, in view of the small area of the choke orifice.

In the event it is desired to vary the torque at which the primary clutch 11 will release, it is only necessary to either increase or decrease the compressive force of the spring 104 by placing a suitable screw driver in the screw driver slot 107 of the spring seat 108 and turning it within the bore 105 in the desired direction. An increase in the spring force will effect an increase in the constant pressure maintained in the chamber 80, whereas a decrease in the spring force will effect a decrease in the constant air pressure maintained within the chamber. The torque at which primary clutch release will occur is changed in accordance with the force exerted by the air pressure in the chamber 80 on the valve head.

In the form of invention disclosed in Figs. 6 and 7, the torque releasable primary clutch device 11a, as well as the fluid pressure actuated holding valve mechanism, is essentially the same as in the other form of the invention. The valve body 110 is constituted as a separate element contained within the driving clutch member 20a, its forward end engaging the chamber closure 60 and its rearward end engaging the rearward transverse wall 65 of the driving member. A modified form of air pressure control device 100a is disclosed, there being a valve body 111 suitably secured to the housing section 17a of the apparatus. An inlet line 70a is connected to the valve body by means of the clamp nut 112 engaging the flared end 113 of the line, air under pressure from the inlet line 70a passing through an inlet orifice passage 71a of comparatively small area into the valve body chamber 114, from where the air flows into the inlet port 73a in the housing wall 18a, which communicates with the peripheral groove 74 in the drive shaft 10a, as in the other form of the invention.

A passage 115 provided in the drive shaft communicates with the peripheral groove 74 and also with an axial bore 116 in the drive shaft 10a in which a rearward pilot portion 117 of the valve body 110 is disposed. The air from the bore 116 passes into a pasage 118 in the valve body that opens into a space 119 between the end wall 65 of the driving member 20a and the end wall 120 of the valve body, from where the air flows through a port 121 in the body into an annular space 122 between the periphery of the valve body 110 and the driving member 20a, the air passing from such space through a port 123 into the chamber 80 on the forward side of the valve head 64. When the valve head 64 is removed from a position in which its seal ring 66 engages the valve seat 68, the air in the chamber 80 flows around the head and out through an exhaust passage 124 in the valve body pilot portion 117 opening into a peripheral groove 125 in such portion. From the peripheral groove, the air passes through a transverse passage 126 in the drive shaft 10a into the housing, to escape therefrom through the outlet port 86. Leakage of fluid along the pilot portion 117 is prevented by suitable seal rings 127, such as rubber or rubberlike O rings, disposed in peripheral grooves 128 in the pilot portion on opposite sides of its exhaust groove 125 and engaging the inner wall of the drive shaft bore 116.

The air in the valve body 111 can also pass through a pressure relief valve 100a provided in the body. Thus, air under pressure can flow from the interior 114 of the body through an inlet port 101a, which is surrounded by a valve seat 102a engageable by a valve ball 103a, which is urged into such engagement by a compressed spring 104a bearing against the ball and against a spring seat or stem 106a threaded within a threaded bore 105a, containing the ball and spring, and extending outwardly of the valve body. The outer portion 107a of the seat may be knurled, to permit the seat to be readily threaded into and out of the valve body 105a by hand.

The apparatus disclosed in Figs. 6 and 7 operates in essentially the same manner as in the other form of the invention. The pressure to be maintained within the chamber 80 is the same as the pressure necessary to shift the ball valve element 103a from its seat 102a. The pressure in the inlet line 70a is substantially higher than the air pressure desired in the chamber 80, and that required to open the pressure relief valve 100a. Such air under pressure passes through the choke orifice 71a into the valve body 111, and will disengage the ball 103a from its seat 102a against the force of the spring 104a, the air flowing around the ball and then out through the outlet port 106a in the valve body to the atmosphere. If the pressure in the inlet line 70a were to decrease, then the spring 104a would shift the ball 103a closer to its seat 102a, allowing a lesser amount of air to escape from the valve housing 11, and maintaining the air pressure in the passages 73a, 115, 118, 119, 121, 123 and the chamber 80 at a constant figure. On the other hand, if the air pressure in the inlet line 70a were to increase, then the ball valve 103a would shift against the force of the spring 104a a greater distance from its seat 102a, to allow a greater volume of air to escape from the valve body 11, still maintaining the pressure in the valve body passages and the chamber at the desired constant value, corresponding to the force exerted by the spring 104a on the valve element 103a.

As in the other form of the invention, the pressure in the chamber 80 can be changed merely by rotating the valve seat member 106 within the body to change the compressive force of the spring 104a that is being exerted against the ball 103a.

In both forms of the invention, the air pressure in the chamber 80 is much less than the air pressure in the inlet line, such difference in air pressure being readily secured by virtue of the choke orifice 71 or 71a through which the air under pressure must flow before it enters the chamber 80, and also by the pressure relief valves 100 or 100a, which will allow a greater or lesser quantity of air to escape, depending upon an increase or a decrease in the inlet line pressure. The amount of air lost is very small, because of the fact that air at only a small volumetric rate can pass through the choke orifice. Such comparatively small or slow rate of flow does not affect the use of the apparatus, inasmuch as it takes only a relatively small quantity of air under pressure to properly fill the passages in the chamber and the relatively small chamber 80 itself, in order to provide the necessary force tending to hold the primary clutch engaged, which holding force corresponds to the torque at which clutch release is to occur.

The inventor claims:

1. In torque transmitting apparatus: driving and driven members; coengageable clutch elements on said members effecting a rotatable driving connection between said members, said elements comprising cam means responsive to the torque transmitted through said members and tending to shift said elements axially from engagement with each other; fluid pressure operated means for holding said clutch elements in driving relation to each other; means including pressure reducing instrumentalities for conducting fluid under pressure to said fluid pressure operated means; and means communicating with said conducting means on the downstream side of said pressure reducing instrumentalities for relieving fluid pressure in said conducting means in excess of a predetermined value to maintain the fluid pressure acting on said fluid pressure operated means constant, whereby said cam means disengages said clutch elements from each other against the force of said fluid pressure operated means at a preselected torque.

2. In torque transmitting apparatus: driving and driven members; coengageable elements on said members effecting a rotatable driving connection between said members, said elements comprising cam means responsive to the torque transmitted through said members and tending to disconnect said elements by shifting them from engagement with each other; fluid pressure actuated means for holding said elements in driving relation to each other; means adapted to contain fluid at a relatively high pressure; means including pressure reducing instrumentalities for conducting fluid from said containing means to said fluid pressure actuated means at a relatively lower pressure; and means on the downstream side of said pressure reducing instrumentalities for relieving the fluid pressure acting on said fluid pressure actuated means in excess of said lower pressure to maintain the fluid pressure acting on said fluid pressure actuated means constant, whereby said cam means disconnects said elements from each other against the force of said fluid pressure actuated means at a preselected torque.

3. In torque transmitting apparatus: driving and driven members; coengageable elements on said members effecting a rotatable driving connection between said members, said elements comprising cam means responsive to the torque transmitted through said members and tending to disconnect said elements by shifting them from engagement with each other; fluid pressure actuated means for holding said elements in driving relation to each other; means adapted to contain fluid at a relatively high pressure; means including a flow restricting device for conducting fluid from said containing means to said fluid pressure actuated means at a relatively lower pressure; and means on the downstream side of said flow restricting device for relieving the fluid pressure acting on said fluid pressure actuated means in excess of said lower pressure to maintain the fluid pressure acting on said fluid pressure actuated means constant, whereby said cam means disconnects said elements from each other against the force of said fluid pressure actuated means at a preselected torque.

4. In torque transmitting apparatus: driving and driven members; coengageable elements on said members effecting a rotatable driving connection between said members, said elements comprising cam means responsive to the torque transmitted through said members and tending to disconnect said elements by shifting them from engagement with each other; fluid pressure actuated means for holding said elements in driving relation to each other; means adapted to contain fluid at a relatively high pressure; means including a choke orifice for conducting fluid from said containing means to said fluid pressure actuating means at a relatively lower pressure; and means on the downstream side of said orifice for relieving the fluid pressure acting on said fluid pressure actuated means in excess of said lower pressure to maintain the fluid pressure acting on said fluid pressure actuated means constant, whereby said cam means disconnects said elements from each other against the force of said fluid pressure actuated means at a preselected torque.

5. In torque transmitting apparatus: driving and driven members; coengageable elements on said members effecting a rotatable driving connection between said members, said elements comprising cam means responsive to the torque transmitted through said members and tending to disconnect said elements by shifting them from engagement with each other; fluid pressure actuated means for holding said elements in driving relation to each other; means adapted to contain fluid at a relatively high pressure; means including pressure reducing instrumentalities for conducting fluid from said containing means to said fluid pressure actuated means at a relatively lower pressure; and means on the downstream side of said pressure reducing instrumentalities for maintaining constant said lower fluid pressure acting on said fluid pressure actuated means upon variation in said high fluid pressure, whereby said cam means disconnects said elements from each other against the force of said fluid pressure actuated means at a preselected torque.

6. In torque transmitting apparatus: driving and driven members; coengageable elements on said members effecting a rotatable driving connection between said members, said elements comprising cam means responsive to the torque transmitted through said members and tending to disconnect said elements by shifting them from engagement with each other; fluid pressure actuated means for holding said elements in driving relation to each other; means adapted to contain fluid at a relatively high pressure; means including a choke orifice for conducting fluid from said containing means to said fluid pressure actuating means at a relatively lower pressure; and means on the downstream side of said orifice for maintaining constant said lower fluid pressure acting on said fluid pressure actuated means upon variation in said high fluid pressure, whereby said cam means disconnects said elements from each other against the force of said fluid pressure actuated means at a preselected torque.

7. In torque transmitting apparatus: driving and driven members; coengageable elements on said members effecting a rotatable driving connection between said members, said elements comprising cam means responsive to the torque transmitted through said members and tending to disconnect said elements by shifting them from engagement with each other; fluid pressure actuated means for holding said elements in driving relation to each other; means adapted to contain fluid at a relatively high pressure; means including pressure reducing instrumentalities for conducting fluid from said containing means to said fluid pressure actuated means at a relatively lower pressure; and means on the downstream side of said pressure reducing instrumentalities for relieving the fluid pressure acting on said fluid pressure actuated means in excess of said lower pressure to maintain the fluid pressure acting on said fluid pressure actuated means constant, whereby said cam means disconnects said elements from each other against the force of said fluid pressure actuated means at a preselected torque; said relieving means comprising a fluid inlet passage, a valve seat surrounding said inlet passage, an outlet passage communicable with said inlet passage, a valve head, and spring means urging said valve head toward engagement with said seat.

8. In torque transmitting apparatus: driving and driven members; coengageable elements on said members effecting a rotatable driving connection between said members, said elements comprising cam means responsive to the torque transmitted through said members and tending to disconnect said elements by shifting them from engagement with each other; fluid pressure actuated means for holding said elements in driving relation to each other; means adapted to contain fluid at a relatively high pressure; means including pressure reducing instrumentalities for conducting fluid from said containing means to said fluid pressure actuated means at a relatively lower pressure; means on the downstream side of said pressure reducing instrumentalities for relieving the fluid pressure acting on said fluid pressure actuated means in excess of said lower pressure to maintain the fluid pressure acting on said fluid pressure actuated means constant, whereby said cam means disconnects said elements from each other against the force of said fluid pressure actuated means at a preselected torque; said relieving means comprising a fluid inlet passage, a valve seat surrounding said inlet passage, an outlet passage communicable with said inlet passage, a valve head, and spring means urging said valve head toward engagement with said seat; and means for varying the force exerted by said spring means on said valve head.

9. In torque transmitting apparatus: driving and driven members; coengageable elements on said members effecting a rotatable driving connection between said members, said elements comprising cam means responsive to the torque transmitted through said members and tending to disconnect said elements by shifting them from engagement with each other; fluid pressure actuated means for holding said elements in driving relation to each other; means adapted to contain fluid at a relatively high pressure; means including a choke orifice for conducting fluid from said containing means to said fluid pressure actuating means at a relatively lower pressure; and means on the downstream side of said orifice for relieving the fluid pressure acting on said fluid pressure actuated means in excess of said lower pressure to maintain the fluid pressure acting on said fluid pressure actuated means constant, whereby said cam means disconnects said elements from each other against the force of said fluid pressure actuated means at a preselected torque; said relieving means comprising a fluid inlet passage, a valve seat surrounding said inlet passage, an outlet passage communicable with said inlet passage, a valve head, and spring means urging said valve head toward engagement with said seat.

10. In torque transmitting apparatus: driving and driven members; coengageable clutch elements on said members effecting a rotatable driving connection between said members, said elements comprising cam means responsive to the torque transmitted through said members and tending to shift said elements axially from engagement with each other; fluid pressure actuated means rotatable and movable axially with one of said members for holding said elements in driving relation to each other; means adapted to contain fluid at a relatively high pressure; means including pressure reducing instrumentalities for conducting fluid from said containing means to said fluid pressure actuated means at a relatively lower pressure; and means on the downstream side of said pressure reducing instrumentalities for maintaining constant said lower fluid pressure acting on said fluid pressure actuated means upon variation in said high fluid pressure, whereby said cam means disconnects said elements from each other against the force of said fluid pressure actuated means at a preselected torque.

11. In torque transmitting apparatus: driving and driven members; coengageable clutch elements on said members effecting a rotatable driving connection between said members, said elements comprising cam means responsive to the torque transmitted through said members and tending to shift said elements axially from engagement with each other; fluid pressure actuated means rotatable and movable axially with one of said members for holding said elements in driving relation to each other; means adapted to contain fluid at a relatively high pressure; means including a choke orifice for conducting fluid from said containing means to said fluid pressure actuated means at a relatively lower pressure; and means on the downstream side of said orifice for relieving the fluid pressure acting on said fluid pressure actuated means in excess of said lower pressure, to maintain the fluid pressure acting on said fluid pressure actuated means constant, whereby said cam means disconnects said elements from each other against the force of said fluid pressure actuated means at a preselected torque, said relieving means comprising a fluid inlet passage, a valve seat surrounding said inlet passage, an outlet passage communicable with said inlet passage, a valve head, and spring means urging said valve head toward engagement with said seat.

12. In torque transmitting apparatus: driving and driven members; coengageable clutch elements on said members effecting a rotatable driving connection between said members, said elements comprising cam means responsive to the torque transmitted through said members to disengage said elements from each other; a first valve member rotatable with one of said members and having an exhaust passage; a second valve member rotatable with the other of said members and subjected to fluid under pressure to close said exhaust passage and hold said elements in engagement in opposition to the disengaging force exerted between said elements while transmitting torque; means adapted to contain fluid at a relatively high pressure; means including pressure reducing instrumentalities for conducting fluid from said containing means to said second valve member at a relatively lower pressure for action upon said second valve member; and means on the downstream side of said pressure reducing instrumentalities for maintaining constant said lower fluid pressure acting on said second valve member upon variation in said high fluid pressure, whereby said cam means disengages said elements from each other at a preselected torque against the force of the fluid under pressure acting on said second valve member.

13. In torque transmitting apparatus: driving and driven members; coengageable clutch elements on said members effecting a rotatable driving connection between said members, said elements comprising cam means responsive to the torque transmitted through said members to disengage said elements from each other; a first valve member rotatable with one of said members and having an exhaust passage; a second valve member rotatable with the other of said members and subject to fluid under pressure to close said exhaust passage and hold said elements in engagement in opposition to the disengaging force exerted between said elements while transmitting torque; means adapted to contain fluid at a relatively high pressure; means including a choke orifice for conducting fluid from said containing means to said second valve member at a relatively lower pressure; and means on the downstream side of said orifice for relieving the fluid pressure acting on said second valve member in excess of said lower pressure to maintain the fluid pressure acting on said second valve member constant, whereby said cam means disengages said elements from each other at a preselected torque against the force of the fluid under pressure acting on said second valve member, said relieving means comprising a fluid inlet passage, a valve seat surrounding said inlet passage, an outlet passage communicating with said inlet passage, a valve head, and spring means urging said valve head toward engagement with said seat.

14. In torque transmitting apparatus: driving and driven members; coengageable clutch elements on said members effecting a rotatable driving connection between said members, said elements comprising cam means responsive to the torque transmitted through said members to disengage said elements from each other; a first valve member rotatable with one of said members and having an exhaust passage; a second valve member rotatable with the other of said members and subject to fluid under pressure to close said exhaust passage and hold said elements in engagement in opposition to the disengaging force exerted between said elements while transmitting torque; means adapted to contain fluid at a relatively high pressure; means including a choke orifice for conducting fluid from said containing means to said second valve member at a relatively lower pressure; means on the downstream side of said orifice for relieving the fluid pressure acting on said second valve member in excess of said lower pressure to maintain the fluid pressure acting on said second valve member constant, whereby said cam means disengages said elements from each other at a preselected torque against the force of the fluid under pressure acting on said second valve member, said relieving means comprising a fluid inlet passage, a valve seat surrounding said inlet passage, an outlet passage communicating with said inlet passage, a valve head, and spring means urging said valve head toward engagement with said seat, and means for varying the force exerted by said spring means on said valve head.

References Cited in the file of this patent
UNITED STATES PATENTS

| | | |
|---|---|---|
| 2,373,664 | Emery | Apr. 17, 1945 |
| 2,683,512 | Boice | July 13, 1954 |
| 2,722,302 | Stoeckicht | Nov. 1, 1955 |
| 2,741,352 | Stevens et al. | Apr. 10, 1956 |
| 2,755,903 | McAninch et al. | July 24, 1956 |